(12) United States Patent
Nirmal et al.

(10) Patent No.: US 12,434,464 B2
(45) Date of Patent: Oct. 7, 2025

(54) CONFORMABLE SHEET ARTICLES, CONSTRUCTIONS, AND METHODS OF USING THE SAME

(71) Applicant: 3M INNOVATIVE PROPERTIES COMPANY, St. Paul, MN (US)

(72) Inventors: Manoj Nirmal, St. Paul, MN (US); Mary L. Brown, Roseville, MN (US); Kimberly C. M. Schultz, Woodbury, MN (US); Mitchell A. F. Johnson, Woodbury, MN (US); Thomas R. Corrigan, St. Paul, MN (US); Patrick R. Fleming, Lake Elmo, MN (US); Stephen M. Sanocki, Stillwater, MN (US); Jimmy M. Le, St. Paul, MN (US); Steven L. Mahoney, Maplewood, MN (US); Charles E. Jansen, Hudson, WI (US); Matt R. Branscomb, Lakeville, MN (US); Yaohua Gao, Woodbury, MN (US); Elizabeth R. Bright, Minneapolis, MN (US); Ignatius A. Kadoma, Cottage Grove, MN (US); Jeffrey E. Zelinsky, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 182 days.

(21) Appl. No.: 18/015,626

(22) PCT Filed: Jul. 13, 2021

(86) PCT No.: PCT/IB2021/056312
§ 371 (c)(1),
(2) Date: Jan. 11, 2023

(87) PCT Pub. No.: WO2022/013754
PCT Pub. Date: Jan. 20, 2022

(65) Prior Publication Data
US 2023/0241876 A1    Aug. 3, 2023

Related U.S. Application Data

(60) Provisional application No. 63/143,169, filed on Jan. 29, 2021, provisional application No. 63/106,927, (Continued)

(51) Int. Cl.
*B32B 29/00* (2006.01)
*B32B 3/28* (2006.01)
(Continued)

(52) U.S. Cl.
CPC .............. *B32B 29/002* (2013.01); *B32B 3/28* (2013.01); *B32B 3/30* (2013.01); *B32B 7/12* (2013.01);
(Continued)

(58) Field of Classification Search
None
See application file for complete search history.

(56) References Cited

U.S. PATENT DOCUMENTS 3,329,331 A  *  7/1967  Morgan ................. B65D 75/26
                                                    229/5.83
4,232,589 A  * 11/1980  Ernst ..................... B65B 43/123
                                                    493/233

(Continued)

FOREIGN PATENT DOCUMENTS

CN    201626642 U  * 11/2010
CN    204415999 U  *  6/2015
(Continued)

OTHER PUBLICATIONS

Liu, Z., Envelope Bag With Self-Adhesion Function, Jun. 24, 2015, machine translation of CN 204415999 (Year: 2015).*
(Continued)

*Primary Examiner* — Chinessa T. Golden (57) ABSTRACT

Conformable sheet article made from paper and useful, for example, in packaging, tapes, and craft article, and methods of making and using such sheet articles are disclosed.

20 Claims, 4 Drawing Sheets

Related U.S. Application Data filed on Oct. 29, 2020, provisional application No. 63/052,123, filed on Jul. 15, 2020.

(51) Int. Cl.
| | |
|---|---|
| *B32B 3/30* | (2006.01) |
| *B32B 7/12* | (2006.01) |
| *B32B 15/12* | (2006.01) |
| *B32B 15/20* | (2006.01) |
| *B32B 27/10* | (2006.01) |
| *B32B 27/32* | (2006.01) |
| *B32B 29/08* | (2006.01) |

(52) U.S. Cl.
CPC .............. *B32B 15/12* (2013.01); *B32B 15/20* (2013.01); *B32B 27/10* (2013.01); *B32B 27/32* (2013.01); *B32B 29/08* (2013.01); *B32B 2255/12* (2013.01); *B32B 2405/00* (2013.01); *B32B 2553/00* (2013.01)

(56) References Cited

U.S. PATENT DOCUMENTS

| | | | |
|---|---|---|---|
| 5,860,524 A | 1/1999 | Weder | |
| 6,706,388 B2 * | 3/2004 | Finestone | B32B 27/10 |
| | | | 428/513 |
| 2005/0153110 A1 * | 7/2005 | Juby | B32B 27/10 |
| | | | 428/195.1 |
| 2017/0260694 A1 | 9/2017 | Torniainen et al. | |
| 2017/0361573 A1 * | 12/2017 | Malmgren | D21H 21/54 |
| 2019/0389641 A1 * | 12/2019 | Herron | B65D 75/5805 |

FOREIGN PATENT DOCUMENTS

| | | |
|---|---|---|
| CN | 108943893 A * | 12/2018 |
| GB | 666501 A | 2/1952 |
| WO | 2019142172 A1 | 7/2019 |
| WO | 2020036787 A1 | 2/2020 |

OTHER PUBLICATIONS

Lin, Shockproof Paper Pad, Nov. 10, 2010, machine translation of CN 201626642 (Year: 2010).*
Fei, Packaging Material, Dec. 7, 2018, machine translation of CN 108943893 (Year: 2018).*
International Search Report for PCT International Application No. PCT/IB2021/056312, mailed on Oct. 14, 2021, 4 pages.
Sageman-Furnas, "The Sphereprint: An Approach To Quantifying The Conformability Of Flexible Materials", Textile Research Journal, 2014, vol. 84, No. 08, pp. 793-807.

* cited by examiner

CONFORMABLE SHEET ARTICLES, CONSTRUCTIONS, AND METHODS OF USING THE SAME

CROSS REFERENCE TO RELATED APPLICATIONS

This application is a national stage filing under 35 U.S.C. 371 of PCT/IB2021/056312, filed Jul. 13, 2021, which claims the benefit of U.S. Provisional Application No. 63/052,123, filed Jul. 15, 2020; U.S. Provisional Application No. 63/106,927, filed Oct. 29, 2020; U.S. Provisional Application No. 63/143,169, filed Jan. 29, 2021, the disclosure of which is incorporated by reference in its/their entirety herein.

BACKGROUND

Pulp and paper products, such as cardboard, which can be used as packaging materials are known. Conformable packaging sheets are available under the trade designation Flex and Seal from 3M Company (St. Paul, Minnesota, USA). Adhesives useful with pulp and paper products are known. US20170260694 discloses fiber sheets having, for example a stretch in the range of 5% to 45% and elongation at break of 5% to 50%.

DETAILED DESCRIPTION

Throughout this disclosure, singular forms such as "a," "an," and "the" are often used for convenience; however, the singular forms are meant to include the plural unless the singular alone is explicitly specified or is clearly indicated by the context. When the singular alone is called for, the term "one and only one" is typically used.

Some terms in this disclosure are defined. Other terms will be familiar to the person of skill in the art and should be afforded the meaning that a person of ordinary skill in the art would have ascribed to them.

Terms indicating a high frequency, such as (but not limited to) "common," "typical," and "usual," as well as "commonly," "typically," and "usually" are used herein to refer to features that are frequently employed in the disclosure and, unless specifically used with reference to the prior art, are not intended to mean that the features are present in the prior art, much less that those features are common, usual, or typical in the prior art.

"Bending stiffness" as used herein is measured according to the TAPPI T489 method and relates to values in the cross-web (CD) direction unless otherwise noted. The bending stiffness values reported herein were determined using a Model 15-D Stiffness tester (Teledyne Taber, North Tonawanda, NY, USA) which provides results in Taber Stiffness Units; Taber Stiffness Units are converted to mN-m by multiplying by a factor of 0.098067.

The term "compostable" refers to materials, compositions, or articles that meet the ASTM D6400 standard, the ASTM D6868 standard, or both the ASTM D6400 standard and the ASTM D6868 standard. In addition, to meeting the ASTM D6400 or ASTM D6868 standard, compostable materials, compositions, or articles can optionally meet the ASTMD5338 standard. In addition, to meeting the ASTM D6400 or ASTM D6868 standard, compostable materials, compositions, or articles can optionally meet one or more of the EN 12432, AS 4736, or ISO 17088 standards. In addition, to meeting the ASTM D6400 or ASTM D6868 standard, compostable materials, compositions, or articles can optionally meet the ISO 14855 standard. The term "compostable" as used herein is not interchangeable with the term "biodegradable." Something that is "compostable" must degrade within the time specified by the above standard or standards into materials having a toxicity, particularly plant toxicity, that conform with the above standard or standards. The term "biodegradable" does not specify the time in which a material must degrade, nor does it specify that the compounds into which it degrades pass any standard for toxicity or lack of harm to the environment. For example, materials that meet the ASTM D6400 standard must pass the test specified in ISO 17088, which addresses "the presence of high levels of regulated metals and other harmful components," whereas a material that is "biodegradable" may have any level of harmful components.

The term "conformable" refers to materials, compositions, or articles that have a Sphereprint Ratio (SR) no less than 0.1, particularly no less than 0.2, more particularly no less than 0.25, and most particularly no less than 0.275. According to the definition of SR, SR values cannot exceed 1. Thus, conformable materials, compositions, or articles may have an SR no greater than 1, particularly no greater than 0.8, more particularly no greater than 0.65, even more particularly no greater than 0.5, yet more particularly no greater than 0.45, and most particularly no greater than 0.4.

In this disclosure, as well as the accompanying claims, SR is determined according the method reported in Textile Research Journal, Vol 84(8), p. 793-807 (2014), with the following modifications (i) a 100.6 mm (4") diameter, 3D printed (Stratasys, ABS filament, 178 um layer height with a solid fill) polymer hemisphere is used, instead of a 50.8 mm (2") diameter, stainless steel hemisphere; (ii) a rubber O-ring (Grainger catalog number 1KEX3) instead of a steel hose clamp is used to conform and hold the test sample on the hemisphere; and (iii) a 254 mm (10") diameter circular test specimen is used instead of a 110 mm diameter specimen.

"Elongation at break" as used herein is measured by the TAPPI T494 method that is modified by using a pull speed of 30 cm/min and an initial grip separation of 10 cm instead of the pull speed and initial grip separation specified in the method. Elongation at break relates to values measured in the cross-web direction (CD) unless otherwise noted. The specific instrument used to obtain reported values of elongation at break is described in the Examples section.

"Paper" as used herein refers to woven or nonwoven sheet-shaped products or fabrics (which may be folded, and may be of various thicknesses) made from cellulose (particularly fibers of cellulose, (whether naturally or artificially derived)) or otherwise derivable from the pulp of plant sources such as wood, corn, grass, rice, and the like. Paper includes products made from both traditional and non-traditional paper making processes, as well as materials of the type described above that have other types of fibers embedded in the sheet, for example, reinforcement fibers.

Paper may have coatings on the sheet or on the fibers themselves. Examples of non-traditional products that are "paper" within the context of this disclosure include the material available under the trade designation TRINGA from PAPTIC (Espoo, Finland), and sheet forms of the material available under the trade designation SULAPAC.

The term "recyclable" refers to materials, compositions, or articles that meet at least one of the Voluntary Standard for Repulping and Recycling Corrugated Fiberboard as promulgated by the Fibre Box Association (FBA) part 1 (repulpability), Voluntary Standard for Repulping and Recycling Corrugated Fiberboard as promulgated by the Fibre Box Association (FBA) part 2 (recyclability), and ISO 18601 standards Particular recyclable items meet the Voluntary Standard for Repulping and Recycling Corrugated Fiberboard part 1 (repulpability). Particular recyclable items meet the Voluntary Standard for Repulping and Recycling Corrugated Fiberboard part 2 (recyclability). More particular recyclable items meet the Voluntary Standard for Repulping and Recycling Corrugated Fiberboard part 1 (repulpability) and part 2 (recyclability). Still more particularly, recyclable items meet the Voluntary Standard for Repulping and Recycling Corrugated Fiberboard part 1 (repulpability) and part 2 (recyclability) standards, as well as the ISO 18601 standard Even more particularly, recyclable items additionally meet the ISO 18604:2013 standard. All references to the Voluntary Standard for Repulping and Recycling Corrugated Fiberboard standard, whether to part 1, part 2, or both, refer to the 2013 version of the standard. It should be noted that a recyclable material may include materials, such as adhesives, that do not meet one or more of the above standards. This is because materials, particularly adhesives, are commonly removed from paper products during the recycling process. Such materials, especially adhesives, that are not themselves recyclable but are readily removed from a product during the recycling process are referred to herein as "recycle-compatible." A "recyclable" article thus may contain components that are recyclable as well as components that are recycle-compatible.

"Tensile strength" and "tensile stiffness" as used herein are measured by the TAPPI T494 method using the sample dimensions, pull speed, and instrument discussed in the Examples section, and relate to values measured in the cross-web direction (CD) unless otherwise noted. Both tensile strength and tensile stiffness are determined from the stress-strain curve which is obtained according to this method; such determination is understood in the art and is further detailed in the examples section.

"Storage modulus" (sometimes referred to as "G'") is measured at a frequency of 1 Hz at room temperature, typically 20° C. to 25° C. The storage modulus is measured by dynamic mechanical analysis using commonly known apparatuses and techniques.

This disclosure recognizes a problem in that packaging articles made of recyclable or compostable materials, and particularly cardboard or paper articles such as boxes and the like, are not conformable. Boxes, for example can be made of recyclable cardboard but are available only in pre-determined sizes that may be too large or too small for the item to be packaged, and in any event do not conform to the size and shape of the article to be packaged. Also, boxes alone, without a space filler or the like, do not provide cushioning for their content. Single face corrugated cardboard that can be recycled or composted is available, but it can bend easily only in one direction and thus is similarly not conformable to the shape of the item to be packaged.

This disclosure also recognizes a problem related to building and craft materials. Rigid building or craft materials that hold their shape, such as stiff paper, cardboard, and the like, require external fasteners, glues, or tapes to attach one piece of material to another. This makes the materials difficult or cumbersome to use.

This disclosure further recognizes a problem related to tapes. Tapes lack rigidity and thus cannot be formed into structures by themselves; instead they must be fastened to more rigid substrates in order form an object that maintains its shape.

Briefly, a solution to one or more of the foregoing problems, as well as other problems, lies in a conformable sheet article as described herein. The article has a paper face and a paper structured sheet having a plurality of separated surface structures. The structured sheet has a first major surface facing an interior surface of the face sheet. A joining layer between the face sheet and the structured sheet affixes the structured sheet to the face sheet. The structured sheet also includes a second major surface that opposes the first major surface. A bonding coating is disposed on the second major surface of the structured sheet. Particularly, the article is recyclable. The structured sheet can formed in a narrow roll, such as a tape roll, or in a wide roll, such as a paper-type roll.

Face Sheet

The face sheet has an interior-facing surface that faces the structured sheet and an exterior-facing surface opposing the interior-facing surface. The face sheet can be made of any type of suitable paper. Suitable papers include Kraft paper, crepe paper, bond paper, and the like. The face sheet can optionally include reinforcement fibers, such as polymer fibers, mineral fibers, non-wood natural fibers, glass fibers, and combinations of the foregoing. When the polymer fibers are employed, they are typically thermoplastic polymers. Commonly used thermoplastic polymers include polylactide, poly(lactic acid), polyglycolide, poly(glycolic acid), polycaprolactone, copolymers of two or more of the foregoing, thermoplastic polyolefins, polyvinyl alcohol, and the like. When reinforcement fibers are used, they can be present in any suitable amount and are typically about 1% to about 50% by weight based on the weight of the face sheet. Examples of reinforcement fibers that can be used are disclosed in US20170260694.

It can be advantageous for the face sheet to have sufficient elongation at break. A face sheet with a higher elongation at break can be stretched more, which may increase the conformability of the final article. Face sheets will typically have an elongation at break are no less than 1.4%, particularly no less than 2%, more particularly no less than 3%, even more particularly no less than 4%, and most particularly no less than 5%. While in principle there is no upper limit on the elongation at break beyond that which is imposed by the specific material employed, in practice a preferable maximum elongation at break can be 30%, more particularly 20%, and most particularly 10%.

It is important to recognize that no specific elongation at break is required. The articles as described herein can be acceptably conformable even without having the above-mentioned values for elongation at break. For example, very thin paper may be acceptable even with lower elongation at break because while users often find the presence of too many visible folds or bends unacceptable, folds or bends in very thin paper may be less visible to the user. Thus, the structured sheet described herein can have a thickness of about 0.04 mm to about 0.6 mm, particularly about 0.07 mm to about 0.3 mm. Further, face sheets with a low tensile stiffness can provide sufficiently conformable articles even if the elongation at break is outside the above-mentioned values.

The face sheet can advantageously have a low tensile stiffness. A face sheet with a lower tensile stiffness can be stretched more, which may increase the conformability of the final article. Face sheets will typically have a tensile stiffness of no more than 2,000 kN/m, preferably no more than 1,500 kN/m, more preferably no more than no more than 1,250 kN/m, even more preferably no more than 1,000 kN/m, and most preferably no more than 750 kN/m. While in principle there is no lower limit to the tensile stiffness, in practice a minimum tensile stiffness is 50 kN/m can be useful so that the material does not give the impression of being to flimsy for an operator to handle.

As with elongation at break, the above-mentioned tensile stiffnesses are not required in all cases. A sufficiently thin face sheet or one with a preferable elongation at break may provide a conformable article without having any particular tensile stiffness value.

The face sheet can be of any suitable basis weight. A variety of basis weights may be suitable depending on the needs of the users. Most commonly, the basis weight in units of $g/m^2$ (grams per square meter) is be no less than 20, optionally no less than 30, optionally no less than 40, optionally no less than 50, optionally no less than 75, optionally no less than 100, optionally no less than 125, optionally no less than 150, optionally no less than 175, optionally no less than 200, optionally no less than 225, or optionally no less than 250. The basis weight (again in units of $g/m^2$) is typically no greater than 250, optionally no greater than 225, optionally no greater than 200, optionally no greater than 175, optionally no greater than 150, optionally no greater than 125, optionally no greater than 100, optionally no greater than 75, optionally no greater than 50, optionally no greater than 40, or optionally no greater than 30. As an example the basis weight (again in units of $g/m^2$) can be 20-250, more particularly the basis weight for nonwovens that are used can be 20-100 for nonwoven, and more particularly the basis weight for a cellulose-based wall can be 50-250.

It is preferred that the flat sheet be free of surface structures like embossments, corrugation, and the like. This preference relates to the cosmetic expectations of some consumers, who may prefer that conformable sheets have a surface that is not heavily wrinkled or that is sufficiently smooth for easy writing. In most cases such concerns do not affect the ability of the conformable sheets to conform to objects. Thus, in some cases, especially those where the cosmetic look of the face sheet is not of primary importance, it can be it is acceptable for the face sheet to have some surface irregularities, folds, wrinkles, cuts, tears, or other imperfections, which are not considered to be surface structures for the purposes of this disclosure.

A joining layer, such as an adhesive, can be disposed on the interior-facing surface.

An optional seal coating can be disposed on at least a portion of the exterior-facing surface, and particularly on the entire exterior-facing surface.

Additional optional coatings can be disposed on either the interior-facing or exterior-facing surface. Such coatings include color coatings (with dyes, pigments, patterns, or similar), non-skid coatings, water resistant coatings, oil and grease protective coatings, and primers to increase printability or writability of the surface.

Joining Layer

A joining layer is disposed between the face sheet and the structured sheet. The joining layer affixes the structured sheet to the face sheet and particularly affixes the interior-facing surface of the face sheet to the first major surface of the structured sheet.

The joining layer can be any layer for joining the two sheets. For example, the joining layer can be a heat-laminating material, such as polyethylene, that can laminate the two sheets together upon heating. Polyethylene coated paper sheets are commercially available and can be used for this purpose. In another example, a cohesive, such as those discussed herein with respect to the bonding coating, and particularly a cold-seal adhesive, can be coated on the interior-facing surface of the face sheet and the first major surface of the structured sheet and used to affix the two sheets.

The joining layer can be a single layer or can comprise multiple layers. When the joining layer comprises multiple layers, it can include one or more inner layers and one or more outer layers on the one or more inner layers. The one or more inner layers, when present can comprise any suitable material or materials. Examples include polymer or plastic sheets, nonwoven or woven sheets, paper, or metals. When metals are employed, they are typically thin foils, wires, meshes, or scrims. Particularly, the inner layer is selected to be recyclable or recycle-compatible.

Most commonly, an adhesive is used. When the joining layer comprises multiple layers, the adhesive is typically a component, and particularly the only component of one, and more particularly all, of the outer layers of the joining layer. When the joining layer is one layer, the one-layer typically comprises adhesive.

The joining layer, which is typically adhesive, can be disposed on either the face sheet, particularly the interior-facing surface of the face sheet, or the structured sheet, particularly the first major surface of the structured sheet, or both. Depending on the nature of the adhesive, it can be applied as a waterborne, solvent-borne, hotmelt, or transfer adhesive. When applied as water or solvent borne adhesive, application may be by any suitable means, such as spray coating, printing, knife coating, or the like. When applied as a transfer adhesive, a transfer tape can be used in a lamination process. Suitable transfer tapes include those available under the trade designation 465 Tape (3M Company, St. Paul, MN, USA).

The adhesive can in principle be any adhesive, for example pressure sensitive adhesives or hot-melt adhesives. The adhesive can be particularly selected to be recyclable or recycle-compatible. The adhesive can be particularly selected to be compostable. The adhesive can more particularly be selected to be compostable as well as recyclable or recycle-compatible.

Examples of adhesives that can be used include pressure sensitive adhesives, starch adhesives, dextrin-based adhesives, water-dispersed adhesives, and hot melt adhesives, and particularly pressure sensitive adhesives. Particular pressure sensitive adhesives include acrylate adhesives, rubber-based adhesives, and silicone adhesives. Examples of suitable adhesives include vinyl-acetate copolymers such as those available under the trade designations Flexbond 150, Dur-O-Set E230, Dur-O-Set E352, and Avicor 384 (Celanese Corporation, Irving, TX, USA), acrylic resins such as those available under the trade designations Acronal (BASF SE, Ludwigshafen, Germany), Rhobond (DuPont de Nemours, Inc., Wilmington, DE, USA), Hycar and Carbotac (both available from The Lubrizol Corporation Wickliffe, OH, USA). Examples of suitable hotmelt adhesives include those based on styrenic block copolymers, ethylene vinyl-acetate copolymers, and thermoplastic polyester, polyamide, and polyurethane resins.

The adhesive can be selected for its mechanical properties, for example, to allow the structured sheet to be displaceable with respect to the face sheet. This displacement can be advantageous as it can decrease the bending stiffness of the overall construction, which in turn can minimize wrinkling, folding, and similar surface flaws that may occur in the face sheet when the article is used to package an item.

The adhesive is typically a viscoelastic adhesive, and more particularly a pressure sensitive adhesive. Viscoelastic adhesives and pressure sensitive adhesives can be particularly advantageous because they permit the adhesive to flow which can result in a conformable sheet article that does not tend to return to its original shape after being bent or folded. However, other types of adhesives can also be used so long as the final article is acceptably conformable and has other appropriate properties for the desired end use. Pressure sensitive adhesives can be selected for their storage modulus. Particular pressure sensitive adhesives include those having a shear storage modulus no more than 0.3 MPa, still more particularly no more than 0.2 MP, even more particularly no less than 0.01 MPa, still more particularly 0.01 MPa to 0.3 MPa, and most particularly 0.01 MPa to 0.2 MPa.

Structured Sheet

The structured sheet has a plurality of separated surface structures. By "separated surface structures," it is meant that at least a portion of one or more of the surface structures are separated from at least a portion one or more other surface structures by unstructured portions of the structured sheet. The plurality of separated surface structures may be any type of surface structure. Commonly employed structures include fluted surface structures, corrugated surface structures, pleated surface structures, embossed surface structures, or combinations thereof. The separated surface structures can also be attached to the structured sheet (rather than being integral to the structured sheet), for example, corrugated strips, spheres, foam pieces, or the like can be adhered or otherwise affixed to the structured sheet. Most particularly, the plurality of separated surface structures are embossed surface structures. It is also possible to use more than one of type of surface structure on the same structured sheet.

The separated surface structures of the structured sheet can be arranged irregularly on the sheet, but more particularly they are arranged in a geometric pattern. The geometric pattern typically has a rotational axis of symmetry (i.e., and S axis) Sn, wherein 360/n is the number of degrees by which a rotation or the geometrical pattern about the axis will return a geometrical pattern that is identical to the original. Thus, n=2 indicates a two-fold axis of symmetry wherein a rotation of 180 degrees will return a geometrical pattern identical to the original, n=3 indicates a three-fold axis of symmetry wherein a rotation of 120 degrees will return a geometrical pattern identical to the original (as will subsequent rotations of 120 degrees), etc. When a rotational axis of symmetry Sn is present, typically n is greater than 2 and no greater than 90, particularly n is no greater than 12, more particularly n is 3-6, even more particularly n is 3 or 4, and most particularly n is 3. Alternatively, the geometrical pattern can have an S2 axis of symmetry. It is also possible for the geometric pattern to incorporate multiple types of symmetry. For example, the geometric pattern could feature an array of sets of elements having an S6 axis, wherein the array itself has an S4 axis.

In most cases, each of the plurality of separated surface structures have the same size and shape. However, it is also possible for the plurality of separated surface structures to include a first set of surface structures having a first size and shape as well as a second set of surface structures having a second size and shape.

The structured sheet comprises a first major surface and opposing second major surface. The first major surface faces the face sheet. The structured sheet, and more specifically the first major surface of the structured sheet, is bound to the face sheet. The adhesive may be disposed on the structured sheet, the face sheet, or both.

In many cases, particularly those wherein the plurality of separated surface structures includes embossments, one of the first and second major surfaces will have protrusions and the other will have recesses. Thus, in some cases the first major surface that contacts the adhesive will have protrusions. In those cases, one or more of the protrusions typically contact the adhesive. In cases where the first major surface contains recesses, typically some of the portions of the first major surface that are not recessed will contact the adhesive.

As mentioned above, the bond between the face sheet and the structured sheet is particularly such that that the structured sheet is displaceable with respect to the face sheet without separating the structured sheet from the face sheet. In this context, "displaceable" means that the structured sheet can move with respect to the face sheet. Specifically, the structured sheet can be slidably displaceable, meaning that the structured sheet can slide along the plane of its first and second major surfaces with respect to the face sheet without separating from the face sheet. In many cases the structured sheet can be slidably displaceable by at least 2 µm, at least 5 µm, at least 10 µm, at least 20 µm, at least 30 µm, at least 40 µm, or at least 45 µm. The structured sheet can be slidably displaceable by no more than 55 µm, no more than 50 µm, no more than 45 µm, no more than 40 µm, no more than 30 µm, or no more than 25 µm.

The structured sheet can be made of the same types of materials as the face sheet, such as any type of suitable paper. Suitable papers include Kraft paper, bond paper, crepe paper, and the like. The face sheet can optionally include reinforcement fibers, such as polymer fibers, mineral fibers, non-wood natural fibers, glass fibers, and combinations of the foregoing. When the polymer fibers are employed, they are typically thermoplastic polymers. Commonly used thermoplastic polymers include polylactide, poly(lactic acid), polyglycolide, poly(glycolic acid), polycaprolactone, copolymers of two or more of the foregoing, thermoplastic polyolefin, polyvinyl alcohol, and the like. When reinforcement fibers are used, they can be present in any suitable amount and are typically about 1% to about 50% by weight based on the weight of the face sheet. Examples of reinforcement fibers that can be used are disclosed in US20170260694.

It can be advantageous for the structured sheet to be able to elongate before breaking. Typically, the elongation at break of the structured sheet is somewhat higher than that of the face sheet. One reason for this can be that, in many cases, the separated surface structures of the structured sheet can flatten somewhat as the structured sheet is stretched. This allows the structured sheet to elongate mechanically before the physical components of the structured sheet, such as the paper fibers, are stretched. Thus, depending on the nature of the structures, the elongation at break of the structured sheet can quite high as large, numerous, or deep surface structures may flatten a great deal; however, if the surface structures are smaller or less numerous, or the structured sheet is stiff, then the elongation at break may be lower and in some cases comparable to that of the face sheet. With this in mind, the elongation at break of the structured sheet can no less than the structured sheet has an elongation at break of 2% or greater, 3% or greater, 5% or greater, or even 7% or greater. The maximum elongation in practice is typically 50%, particularly 40%, and more particularly 25%. Thus particular ranges for the elongation at break of the structured sheet are 7% to 40%, more particularly 7% to 25%.

It is important to recognize that no particular elongation at break is required. The articles as described herein can be acceptably conformable even without having any particular elongation at break or stretch. For example, very thin paper may be acceptable even with lower stretch or elongation at break because while users often find the presence of too many visible folds or bends unacceptable, folds or bends in very thin paper may be less visible to the user. Thus, the structured sheet described herein can have a thickness of about 0.04 mm to about 0.6 mm, particularly about 0.07 mm to about 0.3 mm. Further, structured sheets having a low tensile stiffness can be sufficiently conformable even without having any particular values for elongation at break.

It can be advantageous for the structures sheet to have a low tensile stiffness. A structured sheet with a lower tensile stiffness can be stretched more which can increase the conformability of the final article. For example, the structured sheet can have a tensile stiffness of no more than 500 kN/m, preferably no more than 200 kN/m, more preferably no more than no more than 155 kN/m, even more preferably no more than 100 kN/m, and most preferably no more than 75 kN/m. While in principle there is no lower limit to the tensile stiffness, in practice a minimum tensile stiffness is 50 kN/m can be useful so that the material does not give the impression of being to flimsy for an operator to handle.

As with elongation at break, the above-mentioned tensile stiffnesses are not required in all cases. A sufficiently thin structured sheet or one with a preferable elongation at break may provide a conformable article without having any particular tensile stiffness value.

Bonding Coating

A bonding coating is disposed over at least a portion of the second major surface of the structured layer. The bonding coating can be an adhesive, such as a cold-seal adhesive, and more particularly a pressure-sensitive adhesive. Most particularly the bonding coating is a cohesive. A cohesive is a material that adheres to itself but does not adhere to other materials. Cohesives are known in the art, and particularly suitable cohesives include those disclosed in, for example, WO2020036787 and WO2019142172.

Materials that can be used in the bonding coating can include one or more of polyisoprene rubber, styrene butadiene rubber, polychloroprene, acrylate polymer, acrylate copolymer, thermoplastic polyurethane, synthetic block copolymer, ethylene vinyl acetate, polyvinylalcohol, polyolefin elastomer, and polyamide.

Particular cohesives can have a storage modulus that is no less than $4.5\times10^4$ Pa, more particularly no less than $5\times10^4$ Pa, and even more particularly $5\times10^5$ Pa to $5\times10^6$ Pa.

It is possible that a release liner can be disposed on the bonding coating. However, users may prefer articles without a release liner. Particularly, the article does not include any additional layers or sheet disposed on the bonding coating, more particularly, no release liner is disposed on the bonding coating, and most particularly no additional layers, such as release liners, face sheets, or structured sheets, are disposed on the bonding coating. Such additional layers could make the article rigid and insufficiently conformable.

The bonding coating, such as a cohesive coating, may be disposed over all or a portion of the second major surface. In some cases, it may be advantageous or cost-effective to coat the bonding coating, such as a cohesive coating, in a pattern, such as a geometric pattern, over the second major surface. In such cases, the bonding coating can be coated over less than all the second major surface.

Optional Seal Coating

An optional seal coating can be disposed on the exterior-facing surface of the face sheet (i.e., the surface without the adhesive). Depending on the selected coating material, the seal coating can impart water resistance, improved writability, leak resistance, dirt resistance, or other beneficial properties to the face sheet.

The seal coating can be any coating that imparts one or more of the aforementioned properties and may be selected depending on the intended use of the final article. Many such coatings are known in the art. Some examples of seal coatings are poly(butylene succinate), poly (butylene succinate adipate), poly(ethylene succinate), poly(tetramethylene adipate-co-terephthalate), silicone, fluorinated polymer, acrylics, acrylates, castor wax, polymer wax blends (such as those available under the trade designation HydraBan, and particularly HydraBan 430 from Michelman Inc., OH, USA) or thermoplastic starch, particularly at least one of poly (butylene succinate), poly(butylene succinate adipate), poly (ethylene succinate), castor wax, polymer wax blends, or poly(tetramethylene adipate-co-terephthalate), more particularly poly(butylene succinate), castor wax, or both. Even more particularly poly(butylene succinate) can be used. Even more particularly polymer wax blends (e.g., HydraBan 430) can be used.

Optional Dyes, Printing, or Patterns

An optional layer comprising one or more dyes, printings, or patterns can be included, for example, to impart a pleasing aesthetic look, to provide information or indicia, or for other reasons. The optional dyes, printings, or patterns can be either directly on the face sheet, in which case the optional seal coating, if used, is disposed over the optional dyes, printings, or patterns. Alternatively, the optional dyes, printings, or patterns can be disposed on the seal coating.

When used, the optional dyes, printings, or patterns are usually applied by printing, both other methods, such as spraying, can be used.

Any suitable paper dyes, inks, and the like can be used for the optional dyes, printings, or patterns. Suitable dyes, inks, and the like can be selected to be printable on or to adhere to the surface on which they are disposed, such as the seal coating or the face sheet. When disposed on the face sheet, they can be further selected such that they will not interfere with application of the seal coat, when a seal coating is used.

Conformable Sheet Articles

The conformable sheet articles are advantageously recyclable, as defined herein. The conformable sheet articles are optionally compostable, though this is not required.

The conformable sheet articles can advantageously have a low bending stiffness. A low bending stiffness can provide a final article that bends better without crinkling or crumpling, and thus is more conformable. Conformable sheet articles as disclosed herein will typically have a bending stiffness of no more than 8.8 mN-m, preferably no more than 5 mN-m, more preferably no more than 2.5 mN-m. Preferably, the minimum bending stiffness is 0.015 mM-m. A low bending stiffness may contribute to the article minimizing wrinkles or folds when it is conforming around one or more objects and may also increase the conformability of the conformable sheet article. However, sufficient conformability can be obtained without the specified bending stiffnesses. Further, wrinkles or folds may be acceptable in some applications or uses of the conformable sheet articles. Thus, the bending stiffnesses specified herein are not required in all cases.

The conformable sheet articles typically have an elongation at break that is similar to that of the face sheet. The face sheet typically has an elongation at break that is lower than that of the structured sheet. Thus, conformable sheet articles will typically have an elongation at break are no less than 1.4%, particularly no less than 2%, more particularly no less than 3%, even more particularly no less than 4%, and most particularly no less than 7%. While in principle there is no upper limit on the elongation at break beyond that which is imposed by the type of material (paper), in practice a preferable maximum elongation at break can be 30%. It is important to recognize that no particular elongation at break is required. Depending on the nature of the components, such as the face sheet, joining layer, and structured sheet, the articles as described herein can be acceptably conformable even without having any particular elongation at break.

The conformability of the conformable sheet articles can be described by way of the Sphereprint Ratio (SR). Typically, the conformable sheet articles disclosed herein have an SR no greater than 0.5, such as no greater than 0.45, no greater than 0.4, or no greater than 0.35. While there is no minimum SR that can be useful, practically the SR is typically no less than 0.01, sometimes no less than 0.05, or even no less than 0.1. Thus, exemplary ranges for SR may be 0.01-0.45, 0.05-0.45, or even 0.1-0.45.

The conformable sheet articles can be in the form of a roll, though this is not required. When in the form of a roll, the conformable sheet article is typically wound upon itself so that the bonding coating (or a release liner, if used) is facing the exterior-facing surface of the face sheet. Any dispenser for rolled sheets, such as those used for rolled tapes, aluminum foil, plastic wrap, or the like, can be used to dispense rolled conformable sheet article.

Methods of Using and Packaging Constructions

In one method of use, a conformable sheet article can be cut into the desired size, laid on a surface, and an article placed on the article, typically on the bonding coating. The cutting step can, of course, be skipped if the conformable sheet article is already in a desired size. The article can then be folded upon itself to make a pouch and sealed by adhering one portion of the bonding coating to another portion of the bonding coating. The result is a packaging construction with the object disposed within the pouch created by folding the sheet of the packaging article upon itself.

It is also possible to adhere a portion of the bonding coating to a portion of the face sheet. This can be useful, for example, when the bonding coating comprises adhesive rather than cohesive, and can be accomplished by folding the article over an edge so that the bonding coating contacts the face sheet.

Similarly, a method of wrapping an object can include placing an object on the bonding coating of any packaging article as described herein, wrapping the article around the object, and sealing the article to make a pouch with the object disposed within the pouch. Sealing the pouch typically entails contacting at least one portion of the bonding coating to another portion of the bonding coating, but it may also, in addition or as an alternative, include contacting at least one portion of the bonding coating to at least one portion of the face sheet or a coating disposed on the face sheet (e.g., if a seal coating is used). Pressure may be applied to seal the portion of the bonding coating to the layer, sheet, or portion that the bonding coating contacts.

Methods of Making

Making the packaging articles as disclosed herein can be accomplished by disposing joining layer, and particularly an adhesive, on the desired portions of the face sheet by any suitable means, such as coating, spraying, extruding, and the like. It is also possible to dispose the joining layer on the structured sheet, either before or after making the plurality of surface structured. This can also be accomplished by any suitable means, such as coating, spraying, extruding, and the like.

The plurality of surface structures on the structured sheet can be made by use of known embossing or corrugating machines. Then the structures sheet can be placed against the face sheet to bond the structured sheet to the face sheet. Heating can be employed if necessary, for example, when the joining layer is a hot melt adhesive or a heat-laminating layer.

Finally, the bonding coating can be applied to the second major surface of structured sheet and, if a seal coating, optional dyes, printings, or patterns, or both, are used, the they can be applied over exterior-facing surface of the face sheet in any order.

It is also possible to perform these steps in a different order, for example, one or more of the bonding coating, seal coating, optional dyes, printings, or patterns can be applied before the joining layer, such as adhesive, is applied or after the joining layer, such as adhesive, is applied but before the face sheet is affixed to the structured sheet.

Figure 1:
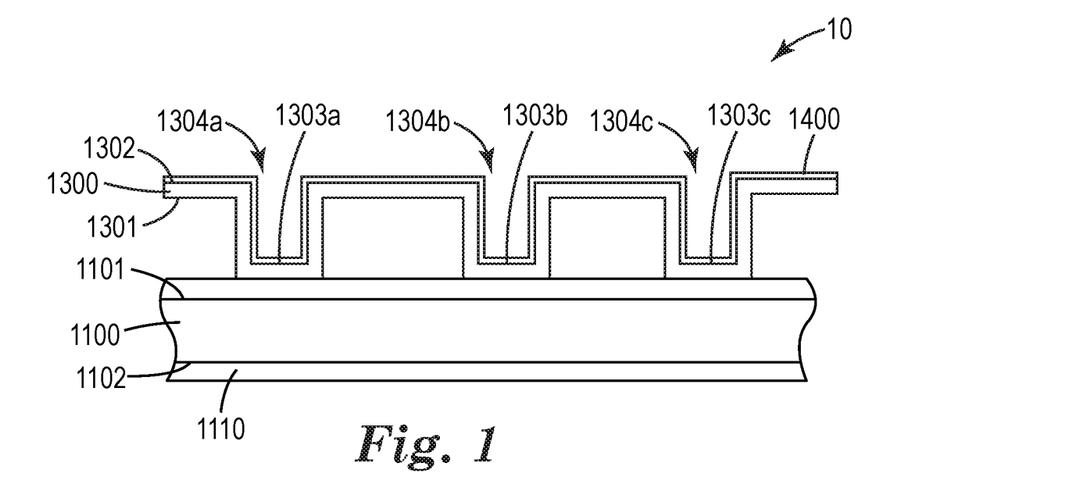
FIG. 1 is a side view of packaging article.

Turning to the Figures, FIG. 1 shows packaging article 10 comprising face sheet 1100 and structured sheet 1300. Structured sheet 1300 includes first major surface 1301 and second major surface 1302. Joining layer 1200, which in particular cases is an adhesive, is disposed between face sheet 1100 and structured sheet 1300. First major surface 1301 faces face sheet 1100, more specifically interior-facing surface 1101 thereof, and contacts joining layer 1200. Thus, structured sheet 1300 is bound to face sheet 1100 by way of joining layer 1200. Seal coating 1110 is disposed on exterior-facing surface 1102 of face sheet 1100. Second major surface 1302 of structured sheet 1300 has bonding coating 1400 disposed thereon.

Second major surface 1302 features a plurality of spaced surface structures 1303*a*, 1303*b*, 1303*c*, which are in the form of protrusions, and corresponding recesses 1304*a*, 1304*b*, 1304*c*. Recesses 1304*a*, 1304*b*, 1304*c* are on the side of second major surface 1302, and protrusions 1303*a*, 1303*b*, 1303*c*, are unstructured or flat portions, which here are located on the side of first major surface 1301.

Figure 2:
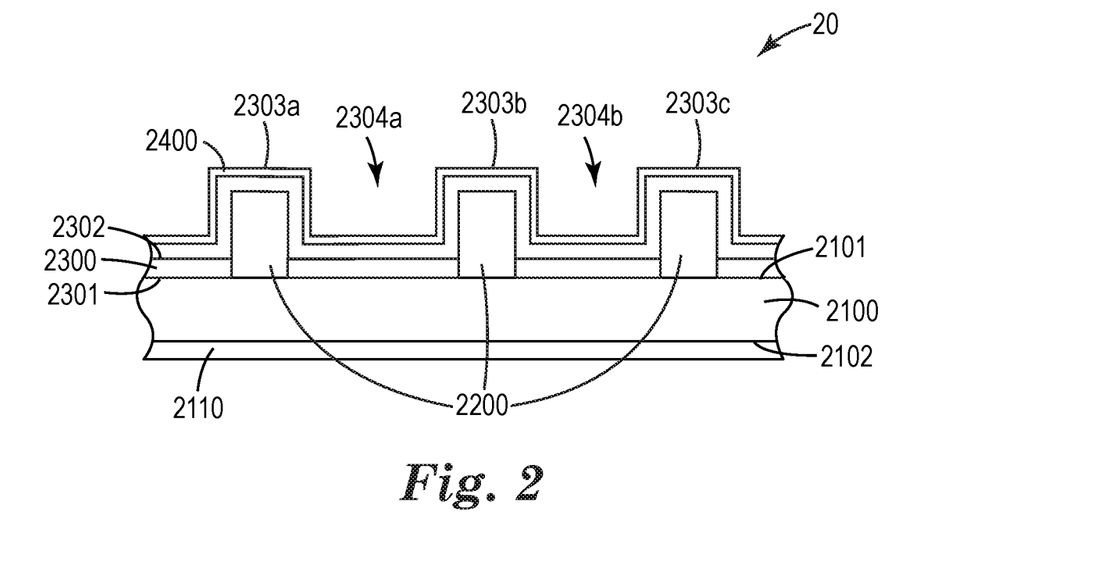
FIG. 2 is a side view of a packaging article.

FIG. 2 shows packaging article 20 having face sheet 2100 with first major surface 2101 and second major surface 2102. Adhesive 2200 is disposed on interior-facing surface 2101 of face sheet 2100. Seal coating 2110 is disposed on exterior-facing surface 2102 of face sheet 2100.

Structured sheet 2300 includes first major surface 2301, which contacts adhesive 2200 thereby binding structured sheet 2300 to face sheet 2100. Second major surface 2302 features a plurality of spaced apart surface structures 2303a, 2303b, 2303c, which are in the form of protrusions, and corresponding recesses 2304a, 2304b. The recesses 2304a, 2304b are unstructured or flat portions, which here are located on the side of first major surface 2301, and protrusions 2303a, 2303b, 2303c are on the side of second major surface 2302.

Note that in both FIG. 1 and FIG. 2, there is no additional layer disposed on the bonding coating.

Figure 3A:
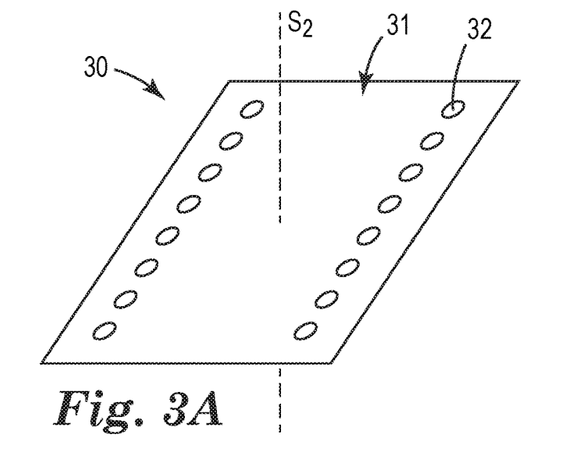
FIGS. 3A-3C are three-quarter top views of packaging articles.

FIG. 3A shows a view of packaging article 30 where structured sheet 31 and the plurality of spaced surface structures 32 are visible. Spaced surface structures 32 are arranged in a geometric pattern around axis S2, which is a two-fold axis of symmetry.

Figure 3B:
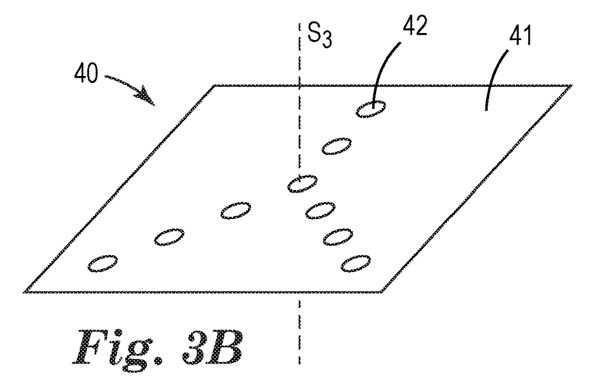

FIG. 3B shows a view of packaging article 40 where structured sheet 41 and the plurality of spaced surface structures 42 are visible. Spaced surface structures 42 are arranged in a geometric pattern around axis S3, which is a three-fold axis of symmetry.

Figure 3C:
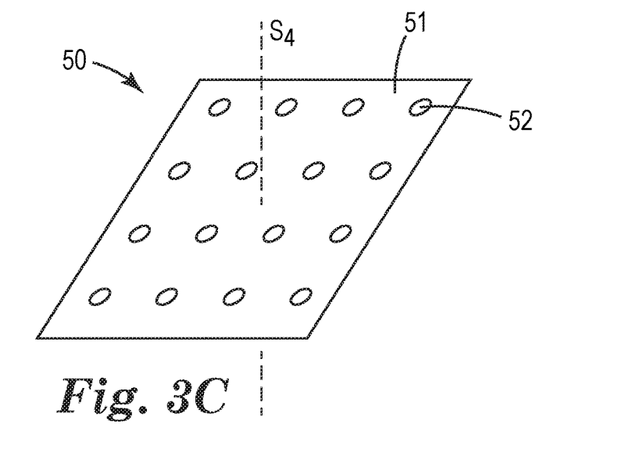

FIG. 3C shows a view of article 50 where structured sheet 51 and the plurality of spaced surface structures 52 are visible. Spaced surface structures 52 are arranged in a geometric pattern around axis S4, which is a four-fold axis of symmetry.

Figure 4A:
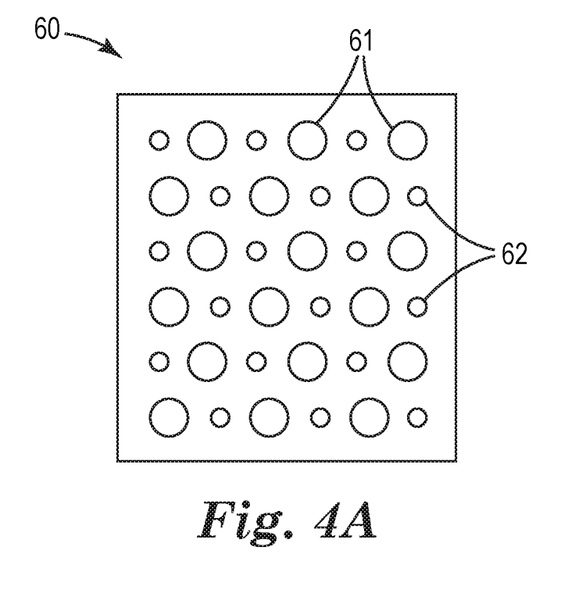
FIGS. 4A-4B are top views of packaging articles.

FIG. 4A shows a view of packaging article 60, having two sets of surface structures. First set of surface structures 61 has a first size and shape, and second set of surface structures 62 has a second size and shape different from the first size or shape.

Figure 4B:
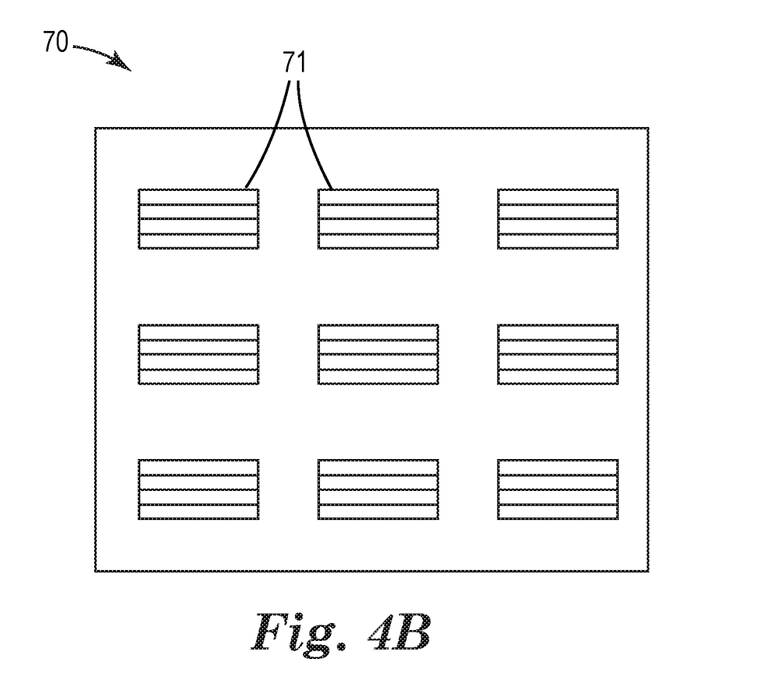

FIG. 4B shows a view of packaging article 70 having spaced surface structures 71, which in this Figure are corrugated.

Figure 5A:
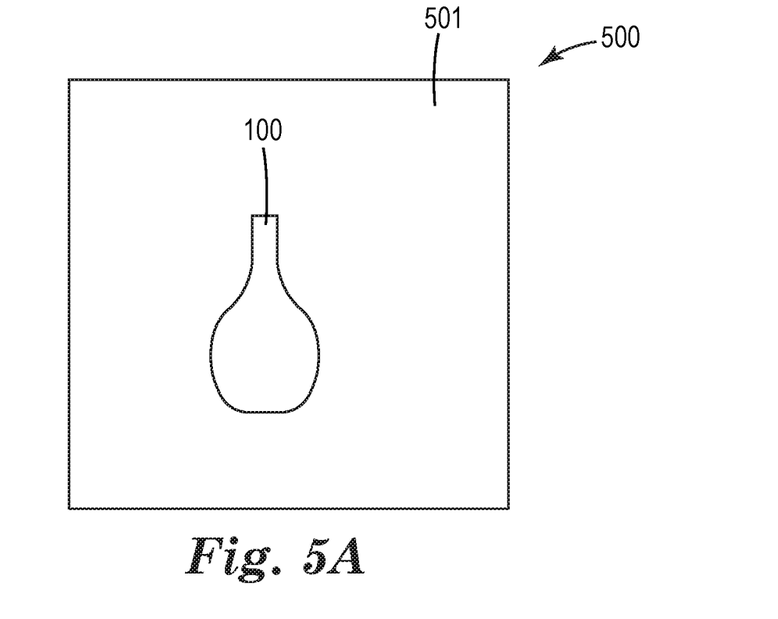
FIGS. 5A-5C are views of a packaging article in use and of a packaging construction made from the packaging article.
Figure 5B:
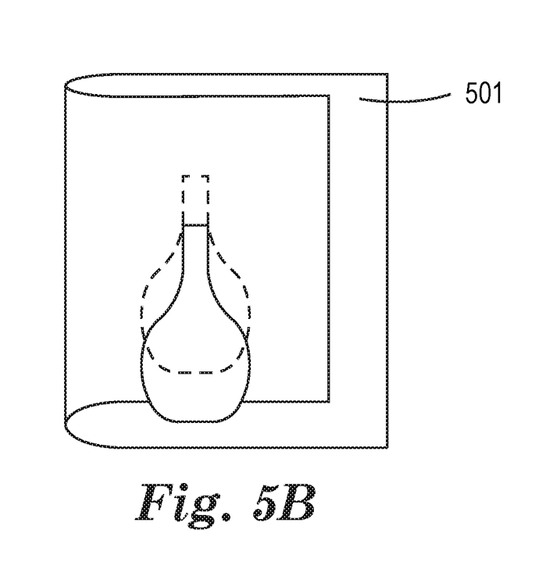
Figure 5C:
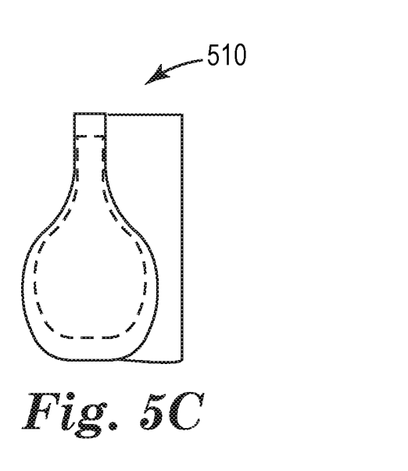

FIGS. 5A-5C show one method of using any packaging article of this disclosure. Here, packaging article 500 is used to wrap object 100 to make packaging construction 510. Object 100 is placed on bonding coating 501 and subsequently packaging article 500 is wrapped around object 100 such that two portions of bonding coating 501 contact each other. Pressing those two portions together seals article 50 around object 100 to form packaging construction 510. Packaging article 500 conforms to the size and shape of object 100, thus minimizing the amount of excess material that is used. A label, such as an identification label or mailing label, (not shown) may be attached to packaging article 510, or it is possible to write directly on packaging article 510.

EXAMPLES

Particular embodiments of the disclosure are shown in the following illustrative examples, which are not intended to demonstrate every embodiment or variation. Unless otherwise noted, all parts, percentages, ratios, etc. are by weight, and all materials used in the examples were obtained, or are available, from general suppliers, such as Georgia-Pacific, Atlanta, GA, US. The following abbreviations are used herein: g=grams, kg=kilograms, m=meters, mm=millimeters, cm=centimeters, µm=microns=$10^{-6}$ m, min=minute, °C.=degrees Celsius, mN=milliNewtons, kN=kiloNewtons.

TABLE 1

Materials

| Material | Description | Source |
| --- | --- | --- |
| Tringa | 45 g/m² basis weight, 0.083 mm caliper, white | PAPTIC Ltd., Espoo, Finland |
| 3M 465 | transfer adhesive | 3M Company, Maplewood, MN, US |
| Bond paper | 74 g/m² basis weight, 0.093 mm caliper, white | available from Georgia-Pacific, Atlanta, GA, US |
| PMH8899 | 5% solids water-based tetrapolymer low adhesion backsize coating | 3M Company, Maplewood, MN, US |
| CH265 | Water-based synthetic latex cohesive coating | VALPAC Inc, Federalsburg, MD, US |
| Kraft paper | 84.5 g/m² basis weight, 0.138 mm caliper, brown | available from Georgia-Pacific, Atlanta, GA, US |
| 50K426 | Water resistant coating | Dreamworks Coating Solutions, Becker, MN, US |
| Stock PE10120, Grade ECT 32 A, | Single-face corrugated | Liberty Carton Company, Golden Valley, MN, US |
| 3541 Foil | Aluminum Foil, thicknesses of 0.016 mm, 0.046 mm, or 0.071 mm | Made by Control Company, available from Capitol Scientific Austin, TX, US |
| Grade 503380 Creped Paper | 50 lb. basis weight creped transformer, natural | Ahlstrom Munksjö, Mosinee, WI, US |
| Virgin grade paper | 76 lb. basis weight virgin grade paper, white | FDS Manufacturing Company, Pomona CA, US |
| PA115 | Polyamide hot melt web adhesive | Bostik, Milwaukee, WI, US |
| Grade 503756 White Creped Paper | 50 lb. basis weight white crepe industrial embossed wallpaper | Ahlstrom Munksjö, Mosinee, WI, US |
| Natural Creped Paper | 50 lb. basis weight natural (tan) creped converting paper | Ahlstrom Munksjö, Mosinee, WI, US |

Sample Preparation Procedures

Example 1

Bond paper was die coated (using a slot die) with CH265 using a roll to roll process (coating weight of about 18.8 g/m$^2$) at a 6 m/min web speed and then oven dried at 110° C. The coated paper was then embossed at 1.5 m/min between two patterned male-female tools having a rectangular array of square-shaped surface structures at 177° C. and a pressure of 1.8 kg/mm to make a structured sheet. The female side of the structured sheet was laminated to the Tringa face sheet using 3M 465. Physical properties of the resulting conformable sheet article were tested according to the methods described in this Examples section, and the results appear in Table 3.

Example 2

Bond paper was die (using a slot die) with CH265 using a roll to roll process (coating weight of about 18.8 g/m$^2$) at a 6 m/min web speed and then oven dried at 110° C. The coated paper was then embossed at 1.5 m/min between two patterned male-female tools having a rectangular array of square-shaped surface structures at 177° C. and a pressure of 1.8 kg/mm to make a structured sheet. The female side of the structured sheet was laminated to another layer of the bond paper (face sheet) using 3M 465. Physical properties of the resulting conformable sheet article were tested according to the methods described in this Examples section, and the results appear in Table 3.

Example 3

Kraft paper having one side pre-coated with 50K426 was obtained from Dreamworks Coating Solutions (Becker, MN, US). Bond paper was die coated with CH265 using a roll to roll process (coating weight of approximately 18.8 g/m$^2$), using a slot die at a 6 m/min web speed and then oven dried at 110° C. The coated paper was then embossed at 1.5 m/min between two patterned male-female tools having a rectangular array of square-shaped surface structures at 177° C. and a pressure of 1.8 kg/mm to make a structured sheet. The female side of the structured sheet was laminated to the coated Kraft paper using the 3M 465. Physical properties of the resulting conformable sheet article were tested according to the methods described in this Examples section, and the results appear in Table 3.

Example 4

A 30 cm wide roll of single-face corrugated was creased on the fluted side, perpendicular to the flute direction, at 2.5 cm intervals. The fluted side of the corrugated paperboard was gravure coated with CH265 at a delivery rate of approximately 90 g/min then dried at 110° C. A paper release liner was made by gravure coating one side of white bond paper with a 5% solids aqueous solution of PMH8889 low adhesion backsize (LAB). The release liner was applied to the sample such that the cohesive was in contact with the side of the liner that was coated with LAB.

Examples 5A, 5B, and 5C

A 30 cm wide roll of crepe paper was die-coated with CH265 on the facing side at approximately 65 g/min to 130 g/min and dried at 110° C. to achieve a dry coat weight of approximately 2.5 mg/cm$^2$. A paper release liner was prepared as described for Example 4, and it was applied to the sample such that the LAB-coated side was in contact with the cohesive. Adhesive transfer tape was then cold laminated to the uncoated side of the crepe paper using a rewinding apparatus. The liner from the transfer adhesive was removed by hand and the sample was applied to a layer of aluminum foil. Three different thicknesses of foil were used: 0.016 mm (Ex. 5A), 0.046 mm (Ex. 5B), and 0.071 mm (Ex. 5C). A second length of transfer adhesive was applied to a second piece of uncoated crepe paper. The liner from this transfer adhesive was then removed by hand and applied to the other face of the same length of foil. A 2.27 kg (5 lb) weighted roller was used to remove air bubbles.

Examples 6A, 6B, 6C, and 6D

For Example 6A, a 10 cm×15 cm (4-inch×6-inch) sheet of 76 lb. white virgin grade paper was die coated with CH265 cohesive at a coating weight of approximately 259 mg (4 grains). It was then soaked in water at room temperature for about 2 minutes to make it more pliable. This wet coated sheet was then embossed between a 3D printed patterned plate and a 3D printed patterned roller, each having a pattern of surface depressions. The patterns on the 3D printed plate and roller each consisted of segments of a circle having a radius of 6.3 mm (0.248 in). Each segment was 3.2 mm (0.125 inches) high and 10.9 mm (0.43 inches) wide and the segments were arranged in a hexagonal array at a center-to-center spacing of 12.3 mm (0.486 in). The patterned roller was pressed into the sheet and rolled over the sheet multiple times until the structures were fully formed in the coated sheet. An absorbent sheet of paper was then placed on top of the embossed sheet and rolled using the same roller to partially dry the embossed sheet. The absorbent sheet was then peeled off and discarded. The embossed sheet was fully dried in an oven at 71° C. (160° F.) for approximately 5 to 10 minutes and was then removed from the patterned plate. A sheet of 503756 creped paper cover sheet was then thermally laminated to the flat side of the embossed sheet with a layer of PA115 web adhesive, using a hot iron set at >115° C.

Example 6B was identical to Example 6A, except that the cover sheet was a sheet of 50 lb natural (tan) creped paper.

Example 6C was identical to Example 6A, except that the patterns on the 3D printed plate and roller each consisted of segments of a circle having a radius of 8.9 mm (0.350 in). Each segment was 5.5 mm (0.215 inches) high and 16.4 mm (0.65 inches) wide and the segments were arranged in a hexagonal array at a center-to-center spacing of 18.5 mm (0.729 in).

Example 6D was identical to Example 6C, except that the cover sheet was a sheet of 50 lb natural (tan) creped paper.

Test Procedures

Tensile strength, elongation at break, and tensile stiffness of sheet materials were measured in both the Machine Direction (MD) and Cross-web Direction (CD) according to TAPPI T494, "Tensile properties of paper and paperboard (using constant rate of elongation apparatus)" using a Criterion 41 load frame (MTS Systems Corporation, Eden Prairie, MN, US). Samples were 2.5 cm wide, the initial grip separation was 10 cm and the elongation speed was 30 cm/min. Modulus of elasticity, E, was determined in the elastic region of the load-elongation curve, and tensile stiffness was calculated as Ext, where t was the sample thickness. Tensile stiffness squareness was calculated as the ratio of MD tensile stiffness to CD tensile stiffness.

Bending stiffness of sheet materials and layered articles was measured in both the Machine Direction (MD) and Cross-web Direction (CD) according to TAPPI T489, "Bending resistance (stiffness) of paper and paperboard (Taber-type tester in basic configuration)" using a Model 150-D Stiffness tester (TELEDYNE TABER, North Tonawanda, NY, US). The instrument provided the moment load applied to each test specimen in Taber Stiffness Units (g-cm), which were converted to units of millinewton-m (mN-m) by multiplying by 0.098067.

Conformability of layered sheet articles was determined using the Sphereprint method as described in A. O. Sageman-Furnas, P. Goswami, G. Menon, S. J. Russell, "The Sphereprint: An approach to quantifying the conformability of flexible materials," *Textile Research Journal*, Vol 84(8), p. 793-807 (2014), with the following modifications: (1) a 10.2 cm diameter, 3D printed polymer hemisphere (ABS filament, 178 µm layer height with a solid fill, from Stratasys, Eden Prairie, MN, US) was used, (2) a rubber O-ring (available from Grainger, Lake Forest, IL, US; Grainger catalog number 1KEX3) was used to conform and hold the test sample on the hemisphere, and (3) a 254 mm diameter circular test specimen was used. This test method yields a Sphereprint Ratio (SR), a quantitative measure of conformability with a value between 0 and 1. Higher values indicate higher conformability.

Results

The mechanical properties of sheet materials and layered articles are summarized in Tables 2 and 3.

TABLE 2

Properties of Individual Sheet Materials

|  |  | Bond Paper | Tringa Sheet | Kraft Paper |
| --- | --- | --- | --- | --- |
| Caliper, mm |  | 0.093 | 0.083 | 0.138 |
| Basis Weight, g/m² |  | 74 | 45 | 84.5 |
| Tensile Strength, kN/m | MD | 6.059 | 2.259 | 6.234 |
|  | CD | 4.115 | 2.014 | 1.891 |
| Elongation at Break, % | MD | 2.3 | 3.2 | 2.1 |
|  | CD | 6.7 | 7.7 | 5.2 |
| Tensile Stiffness, kN/m | MD | 514 | 137 | 553 |
|  | CD | 309 | 59.5 | 178 |
| Tensile Stiffness Squareness |  | 1.7 | 2.3 | 3.1 |
| Bending Stiffness, mN-m | MD | 0.205 | 0.049 | 0.274 |
|  | CD | 0.137 | 0.020 | 0.118 |

TABLE 3

Properties of Layered Conformable Sheet Articles

|  |  | Example 1 | Example 2 | Example 3 |
| --- | --- | --- | --- | --- |
| Sphereprint Ratio |  | 0.304 | 0.342 | 0.278 |
| Bending Stiffness, mN-m | MD | 1.65 | 2.2 | 2.15 |
|  | CD | 1.6 | 1.65 | 1.7 |

What is claimed is:

1. A conformable sheet article comprising
a paper face sheet having an interior-facing surface and an exterior-facing surface;
a paper structured sheet comprising a first major surface facing the interior-facing surface of the face sheet, an opposing second major surface, and a plurality of separated surface structures;
a joining layer between the interior-facing surface of the face sheet and the first major surface of the structured sheet for affixing the structured sheet to the face sheet; and
a bonding coating disposed on the second major surface of the structured sheet, wherein the conformable sheet article is configured to be provided in the form of a roll wound upon itself such that the bonding coating faces the exterior-facing surface of the face sheet.

2. The article of claim 1, wherein the joining layer comprises a heat laminate layer.

3. The article of claim 1, wherein the joining layer comprises at least one of polyethylene, cohesive, adhesive, and cold-seal adhesive.

4. The article of claim 1, wherein the joining layer comprises more than one layer.

5. The article of claim 4, wherein the joining layer comprises an inner layer and two outer layers coated on the inner layer, optionally wherein each of the two outer layers comprises an adhesive and further optionally wherein the inner layer comprises metal foil.

6. The article of claim 1, wherein the bonding coating is an adhesive.

7. The article of claim 1, wherein an adhesive is a pressure sensitive adhesive having a shear storage modulus no more than 0.3 MPa.

8. The article of claim 1, wherein the bonding coating is a cohesive, no less than $5 \times 10^4$ Pa.

9. The article of claim 1, wherein the article does not comprise an additional layer on the bonding coating.

10. The article of claim 1, wherein the article comprises a release liner on the bonding coating.

11. The article of claim 1, wherein the structured sheet has plurality of unstructured portions.

12. The article of claim 11, wherein at least some of the plurality of unstructured portions contact an adhesive.

13. The article of claim 1, wherein the plurality of separated surface structures comprise fluted surface structures, corrugated surface structures, pleated surface structures, embossed surface structures, or a combination thereof.

14. The article of claim 1, wherein the plurality of surface structures comprises protrusions in the first major surface and recessions in the second major surface.

15. The article of claim 1, wherein the plurality of surface structures comprises protrusions in the second major surface and recessions in the first major surface.

16. The article of claim 1, wherein a seal coating is disposed on the exterior-facing surface of the face sheet.

17. A kit comprising a plurality of sheets of the article of claim 1.

18. The article of claim 1 in the form of a roll.

19. A packaging construction comprising an article of claim 1 folded upon itself in the shape of a pouch such that at least one portion of the bonding coating is adhered to another portion of the bonding coating; and
an object disposed within the pouch.

20. A method of wrapping an object, comprising
placing an object on the bonding coating of an article of claim 1;
wrapping the article around the bonding coating; and
sealing the article to create a pouch with the object disposed within the pouch.

* * * * *